United States Patent Office 3,605,271
Patented Sept. 20, 1971

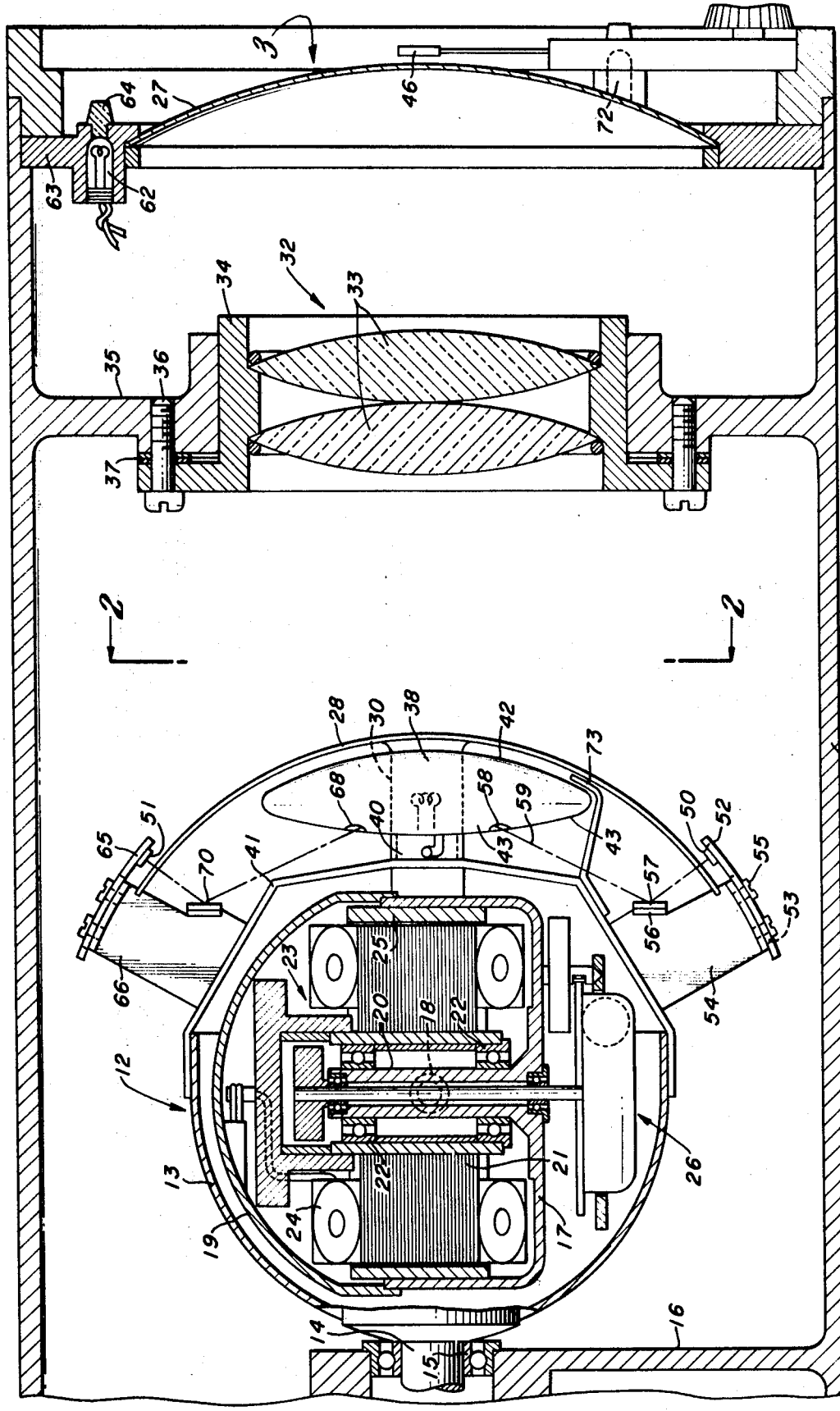

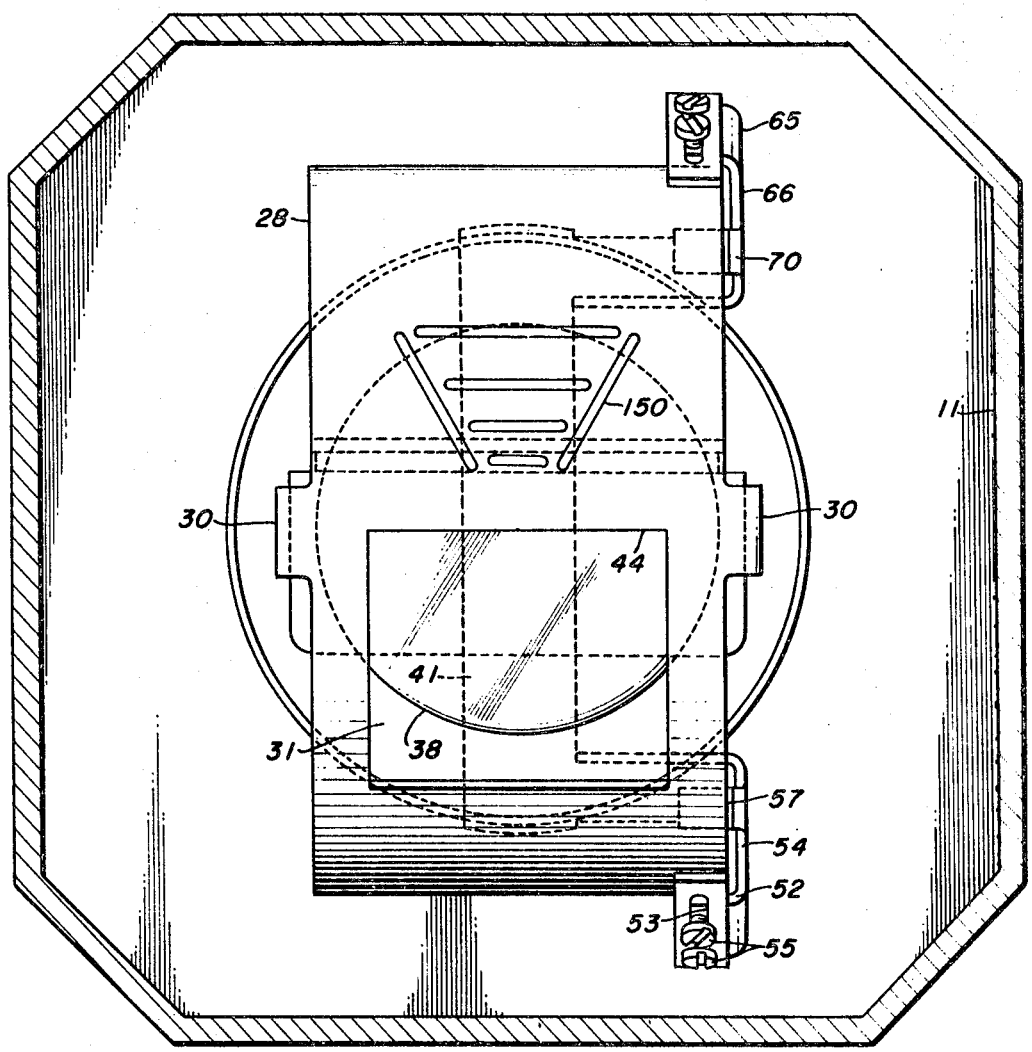
FIG_2

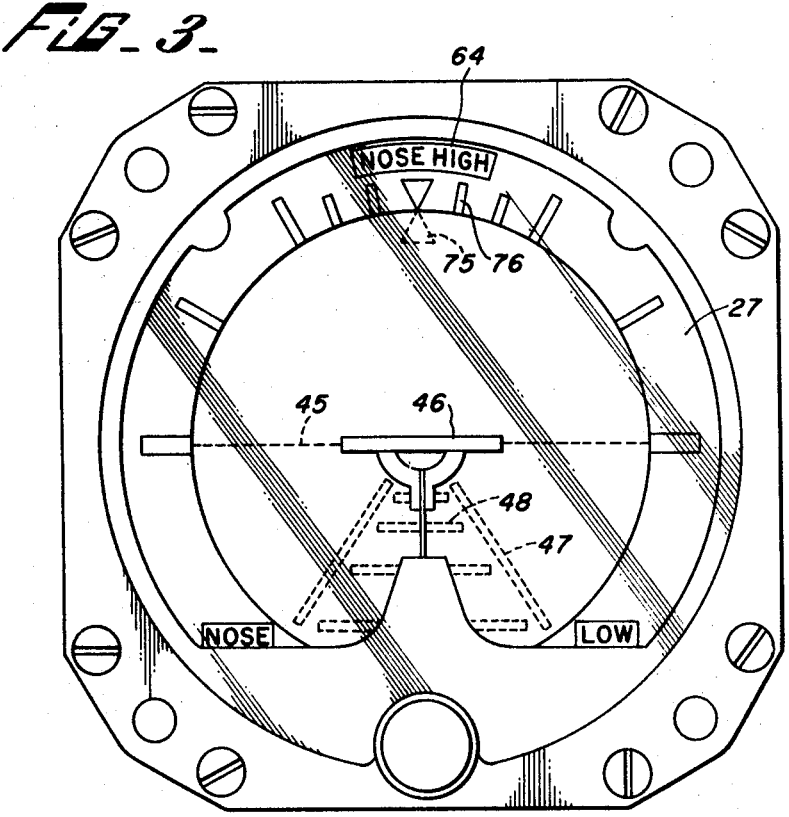
FIG_3_
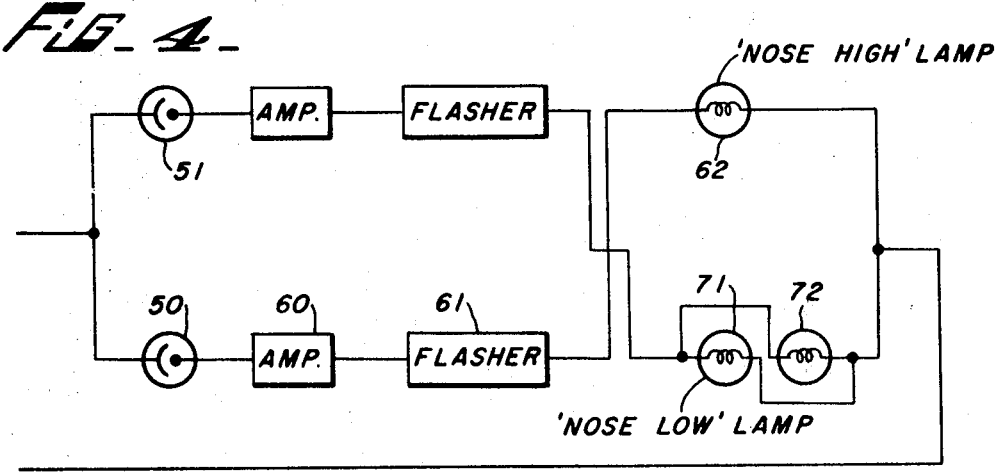
FIG_4_
INVENTORS.
EDGAR R. BRASTOW
RAYMOND A. STOER
JOHN M. LEITCH
BY.
ATTORNEY.

3,605,271
ATTITUDE INDICATING INSTRUMENT
Edgar R. Brastow, Monrovia, Raymond A. Stoer, Thousand Oaks, and John M. Leitch, Alhambra, Calif., assignors to Clary Corporation, San Gabriel, Calif.
Filed Dec. 9, 1968, Ser. No. 782,208
Int. Cl. G01c 15/14; G01d 5/32, 5/34
U.S. Cl. 33—204
9 Claims

ABSTRACT OF THE DISCLOSURE

An artificial horizon instrument having a freely mounted vertical axis gyroscope, a mask carried by the gyroscope rotor housing and a light source carried by a gimbal supporting the rotor housing. One edge of the mask forms a horizon line which is optically projected onto a translucent reference screen. Light beams directed to photocells carried by another of the gyroscope gimbals are normally cut off by the mask but are uncovered when the aircraft assumes an abnormal "nose high" or "nose low" attitude whereby to energize respective alarm devices.

---

This invention relates to attitude indicating instruments for aircraft, such as airplanes and helicopters, and has particular reference to an artificial horizon instrument which indicates the attitude of an aircraft relative to the horizon.

Heretofore, artificial horizon instruments have generally comprised a free gyroscope to present a stable reference, a background screen and an element movable relative to the screen and operatively connected to the gyroscope through suitable linkage to depict the horizon line.

Since the horizon indicating element must remain horizontal in space and the aircraft changes its attitude relative thereto, certain linkage and operating elements must be provided in operative connection to the gyroscope so as to properly indicate the apparent position of the aircraft relative to the horizon. Such horizon indicating element, no matter how light, tends to exert a drag on the gyroscope which may cause precession errors. This is particularly true in the case of helicopters where abnormal vibration may set up a reaction through the linkage against the gyroscope. Such vibration also tends to cause "jittering" of the horizon indicating element due to bearing freedom and yield in the linkage and parts.

It therefore becomes a principal object of the present invention to eliminate any physical connection between a gyroscope and a horizon indicating element controlled thereby.

Another object is to reduce the number of operating parts in an artificial horizon instrument.

Another object is to provide an alarm for indicating when an abnormal "nose high" or "nose low" condition of an aircraft exists.

Another object is to provide a single light source for depicting the sky portion and the horizon in an artificial horizon instrument.

Another object is to project onto a screen a pictorial display in three dimensional effect of a ground scene.

The manner in which the above and other objects of the invention are accomplished will be readily understood on reference to the following specification when read in conjunction with the accompanying drawings, wherein:

FIG. 1 is a longitudinal sectional view through an artificial horizon instrument embodying a preferred form of the present invention.

FIG. 2 is a sectional view taken along line 2—2 of FIG. 1.

FIG. 3 is a front view of the instrument and is taken in the direction of the arrow 3 of FIG. 1.

FIG. 4 is a schematic wiring diagram for the "nose high" and "nose low" indicating lamps.

The artificial horizon instrument comprises a housing or casing 11 adapted to be securely mounted on the instrument panel of an aircraft. A continuously driven gyro generally indicated at 12 is located within and adjacent the rear of the casing and comprises an outer gimbal cup 13 having a spindle 14 pivotally mounted in ball bearbearings, one of which is shown at 15, the bearings being supported by a bracket 16 integral with the casing. An inner gimbal cup 17 is supported by bearings 18 for movement about an axis perpendicular to and intersecting the axis of the spindle 14. A tubular post 20 is formed integral with the gimbal cup 17 and supports a rotor 21 of magnetic material through ball bearings 22, for rotation about an axis intersecting the axes of spindle 14 and bearings 18. A semi-spherical cap member 19 is suitably attached to the cup 17 to enclose the same.

The rotor 21 forms the rotating gyro mass and also forms the rotor of a motor generally indicated at 23. For this purpose, energizing coils 24 are wound on the rotor and are connected through suitable electrical connections to terminals, not shown, adapted to be connected to a source of AC current. The rotor 21 cooperates with a stator ring 25 of magnetic material to develop a motor action and thus cause rotation of the rotor, bringing it up to a speed such that it will exert a gyroscopic action.

A suitable erection device generally indicated at 26 is provided to maintain the spin axis of the rotor in a vertical position. Since such erection systems, in general, are known in the art and do not form a part of the present invention, details of its construction are omitted herein.

For the purpose of projecting a horizon reference line onto a spherical translucent or frosted glass screen 27 at the front of the instrument, an arcuate reticle mask 28 is supported from the inner gimbal cup 17 by brackets 30. The mask has a rectangular opening 31, the image of which is projected onto the screen 27 by an objective lens assembly 32. The latter comprises a pair of achromat lenses 33 carried by a flanged sleeve 34 slideably mounted in a bore formed in the bulkhead 35 and secured in place by clamp screws 36. Focusing of the objective lens assembly may be effected by insertion of shims 37 between the sleeve flange and bulkhead 35.

Preferably, the lens assembly is adjusted to locate the mask in at least substantially the focal plane thereof so that a sharp image of the upper edge 44 of the opening 31 is focused on the screen 27.

An ovulate electric lamp 38 is located directly behind the mask 28 and is removably mounted in a socket 40 carried by a bracket 41 secured to the outer gimbal cup 13. The lamp is formed with a translucent front surface 42 and has a reflective coating 43 on its rear surface.

Normally, when the aircraft is in a horizontal attitude, the upper edge 44 of opening 31 in the mask 28 lies coincident with the optical axis of the lens system 32 so that an image of the lower half of lamp 38, as seen through the opening 31, is inverted by the lens assembly 32 and projected onto the upper half of the screen 27 with the image of the edge 44 forming a horizon line as depicted at 45 in FIG. 3.

For the purpose of indicating the attitude of the aircraft relative to the horizon line 45, a miniature vertically adjustable aircraft silhouette 46 is supported in front of the screen 27. One form of adjustable aircraft silhouette is disclosed in the U.S. patent to W. L. Tracy, No. 2,602,-334, issued on July 8, 1952.

From the above it will be seen that the parts of the screen 27 above the horizon line 45 will be illuminated to simulate the sky and the lower part will remain dark, simulating the ground. However, in order to better pictorially display an image of the ground to the pilot, converging lines 47 and interspaced horizontal lines 48 are also projected onto the screen. Lines 47 and 48 are calibrated in degrees of roll and pitch, respectively. This is effected by forming corresponding slots 150 in the mask above the opening 31.

Means are provided for forming a visual alarm to attract the attention of the pilot when the aircraft assumes an abnormal flying attitude, i.e., an abnormal "nose high" or "nose low"position. For this purpose, two photocells 50 and 51 are provided. The photocell 50 is mounted on a carrier 52 having an elongated slot 53 through which extend clamp screws 55. The latter are attached to a bracket 54 and permit adjustment of the photocell 50 relative to the lower edge of the mask 28. The bracket 54 is integral with bracket 41 and has an ear 56 to which is secured a mirror 57. The latter is adjusted to reflect a beam of light 59 from the lamp 38, and formed by a clear portion 58 in reflective coating 43, toward the photocell 50. However, when the aircraft is in a normal flying attitude, the beam is cut off by the lower portion of the mask 28.

As shown in FIG. 4, the photocell 50 is connected in circuit with an amplifier 60, flasher circuit 61, and a "nose high" lamp 62. The circuit includes suitable flexible connections of conventional construction which permit free pivotal movement of the outer gimbal 13 about its axis. The lamp 62 (see also FIG. 1) is located in a socket formed in a bezel ring 63 which also supports the translucent screen 27. A transparent lens element 64 is supported by ring 63 in front of the lamp. Thus, when the aircraft assumes an abnormal "nose high" position in which, for example, a stall may be imminent, the photocell 50 passes beyond the lower edge of the mask 28, whereby it is energized by the beam of light from the lamp 38 to cause intermittent illumination of lamp 62 to warn the pilot.

On the other hand, photocell 51 is mounted on a carrier 65 which is adjustable to different positions on the bracket 66 also forming part of the bracket 41. When the aircraft is moved to an abnormal "nose low" position, photocell 51 will be moved beyond the upper edge of mask 28. Therefore, second beam of light from the lamp 48, and formed by a clear portion 68 in the reflective coating of lamp 38, will be reflected onto the photocell by a mirror 70, energizing the photocell to intermittently illuminate a pair of "nose low" lamps 71 and 72 in circuit therewith. Such lamps are also mounted in recesses formed in the bezel ring 63 to attract the attention of the pilot.

Obviously, other types of electrically operated alarm devices, such as buzzers, horns, etc., may be used in lieu of or in combination with the lamps 62, 71 and 72.

Means are provided for indicating the amount of roll of the aircraft relative to a vertical reference and for this purpose, a pointer 73 is mounted integrally with the bracket 41 so that a portion thereof extends in front of the lamp 38. The shadow image of the pointer is thus projected onto the screen 27, as seen at 75, FIG. 3. Accordingly, the angular roll position of the aircraft may be determined by reference to angular indicia marks 76 formed adjacent the outer circumference of the screen 27.

It will be noted that the instrument will operate properly through a 360° roll of the aircraft.

We claim:
1. An artificial horizon indicating instrument comprising a housing,
 a gyro rotor in said housing,
 a first gimbal supporting said rotor for rotation about a spin axis,
 a second gimbal supporting said first gimbal for rotation about a normally horizontal second axis perpendicular to said spin axis,
 means in said housing supporting said second gimbal for movement about a third axis perpendicular to said second axis,
 means for erecting said rotor axis whereby to maintain said first gimbal parallel to the horizontal in different positions of said housing,
 a light source supported by said second gimbal,
 a screen,
 an optical system projecting an image of said light source onto said screen, and
 a mask supported by said first gimbal between said light source and said optical system,
 said mask having an horizon defining edge,
 said edge masking off part of said image of said light source whereby to form an horizon representation on said screen.

2. An artificial horizon instrument according to claim 1 wherein said light source has an illuminating area extending over the range of movement of said horizon defining edge.

3. An artificial horizon indicating instrument according to claim 1 wherein said mask has openings therein,
 the edges of said openings masking off part of the image of said light source whereby to form images representing part of a ground scene when projected onto said screen.

4. An artificial horizon indicating instrument according to claim 1 comprising a roll indicating member carried by said second gimbal and extending between said light source and said optical system whereby an image of said roll indicating member is projected onto said screen.

5. An artificial horizon instrument according to claim 1 comprising a first light responsive device supported by said second gimbal and adapted to be controlled by light rays from said light source;
 a "nose high" indicating alarm device controlled by said light responsive device,
 means comprising a second light responsive device supported by said second gimbal and adapted to be controlled by light rays from said light source;
 a "nose low" indicating alarm device controlled by said second light responsive device,
 said mask normally masking said light rays from both said light responsive devices,
 said masking being effective to unmask said light rays from said first light responsive device to when said housing assumes a predetermined "nose high" attitude and effective to unmask said light rays from said second light responsive device when said housing assumes a predetermined "nose low" attitude,.

6. An artificial horizon indicating instrument according to claim 1 comprising an alarm device,
 means including a light responsive device for actuating said alarm device, and
 means for directing a beam of light onto said light responsive device,
 said mask being effective to block and unblock said beam of light as said housing moves from one attitude position to another.

7. An artificial horizon indicating instrument according to claim 6 wherein said light responsive device and said light beam directing means are supported by said second gimbal.

8. An artificial horizon indicating instrument according to claim 1 comprising a light responsive device supported by said second gimbal and adapted to be controlled by light rays from said light source; and
 alarm means controlled by said light responsive device,
 said mask normally masking said light rays from said light responsive device and effective to unmask said light rays when said housing moves from one attitude position to another.

9. An artificial horizon indicating instrument according to claim 8 wherein said mask has openings therein;
 the edges of said openings masking off part of said light rays whereby to form images on said screen representing part of a ground scene.

(References on following page)

References Cited

UNITED STATES PATENTS

| | | | |
|---|---|---|---|
| 2,202,987 | 6/1940 | Egenas | 340—27(Att.)UX |
| 2,396,687 | 3/1946 | Crane | 33—204 |
| 2,448,023 | 8/1948 | Folland et al. | 33—204(.2)UX |
| 2,561,713 | 7/1951 | Svenson et al. | 33—204(.2) |
| 2,608,001 | 8/1952 | Barkalow | 33—204 |
| 2,953,960 | 9/1960 | Robbins | 33—204(.2)X |
| 3,292,176 | 12/1966 | Crane | 340—27(Nav)X |

FOREIGN PATENTS

| | | | |
|---|---|---|---|
| 535,832 | 1/1957 | Canada | 340—27 |
| 797,739 | 2/1936 | France | 33—204(.61) |
| 1,552,984 | 12/1968 | France | 33—204(.2) |
| 930,657 | 7/1955 | Germany | 33—204 |
| 162,205 | 4/1921 | Great Britain | 340—27 |
| 570,204 | 12/1957 | Italy | 33—204(.2) |

ROBERT B. HULL, Primary Examiner